United States Patent [11] 3,609,140

[72] Inventor Rudolf G. Griot
       Florham Park, N.J.
[21] Appl. No. 698,074
[22] Filed Sept. 12, 1967
[23] Division of Ser. No. 356,641, Apr. 1, 1964, Pat. No. 3,351,629
[45] Patented Sept. 28, 1971
[73] Assignee Sandoz-Wander, Inc.
       Hanover, N.J.

[54] 1-CARBOBENZOXY-1,4-DIAZACYCLOHEPTYL-5-IMINO ACETIC ACID DERIVATIVES
2 Claims, No Drawings

[52] U.S. Cl. ................................................. 260/239 BC,
       260/309, 260/326.14 R, 260/326.14 T
[51] Int. Cl. .......................................................... C07d 53/02,
       C07d 57/00
[50] Field of Search .......................................... 260/239
       BC, 309, 326.14

[56] References Cited
UNITED STATES PATENTS
3,141,015 7/1964 Biez et al. ..................... 260/239
3,351,629 11/1967 Griot ............................ 260/239

Primary Examiner—Alton D. Rollins
Attorneys—Gerald D. Sharkin and Frederick H. Weinfeldt ABSTRACT: The Compounds are of the class of 1,4,8--triazabicyclo-[5,3,0]decenΔ$^{7,8}$-10-ones, useful as CNS represents and sedatives.

1-CARBOBENZOXY-1,4-DIAZACYCLOHEPTYL-5-IMINO ACETIC ACID DERIVATIVES

This application is a division of application Ser. No. 356,641, filed Apr. 1, 1964, now U.S. Pat. No. 3,351,629.

This invention concerns compounds of the formula

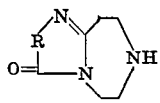

(I)

wherein R is the residue of an α(primary)amino monocarboxylic acid, $H_2N-R-COOH$, which contains only one primary amino group, therapeutically acceptable acid addition salts of said compounds (I), intermediates in the synthesis of said compounds (I) and processes for preparing any of the aforesaid compounds.

The primary α amino acid, $H_2N-R-COOH$, is one wherein R is more specifically defined as

wherein each of $R^1$ and $R^2$ is, independently, either hydrogen (—H); lower alkyl, e.g. methyl, isopropyl and butyl; hydroxy(lower)alkyl, e.g. α-hydroxyethyl; (lower)alkyl-thio-(lower)alkyl, e.g. methyl thioethyl; phenyl(lower)alkyl, e.g. benzyl; substituted benzyl wherein the substituents comprise hydroxy (—OH), bromine (—Br) and/or iodine (—I) and are directly bound to a ring carbon atom, e.g. m,p-dihydroxybenzyl; indolyl(lower)alkyl, e.g. 3-indolylmethyl; imidazole(lower)alkyl, e.g. 4(or 5)-imidazolemethyl; or phenyl. Alternatively, $R^1$ and $R^2$ are, together, either a saturated, e.g. pentamethylene, or an ethylenically unsaturated, e.g. pentadienyl-1, 3-, hydrocarbon chain. Table A reflects some of the contemplated primary α-amino acids and the corresponding definitions of $R^1$ and $R^2$.

Compounds (I) and their pharmaceutically acceptable acid addition salts, e.g. hydrochlorides, fumarates, maleinates, tartrates, methane sulfonates, salicylates and hydrosulfates, are useful as CNS depressants and sedatives. They can be administered either orally or parenterally in doses of from 200 to 300 milligrams per day.

Compounds (I) and therapeutically acceptable acid addition salts thereof are also useful as intermediates in the preparation of saturated compounds of the structure

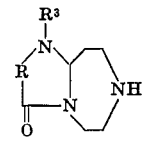

(II)

according to the reactions:

(A)

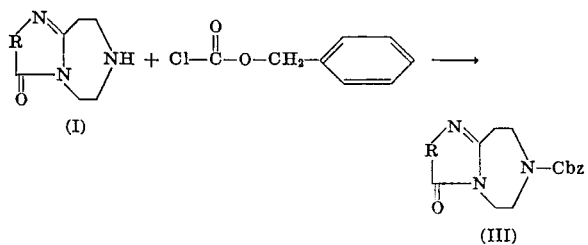

(B)

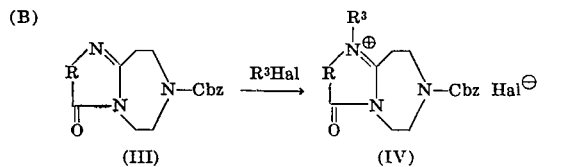

TABLE A

| Name | Formula | $R^1$ | $R^2$ |
|---|---|---|---|
| (1) Glycine | $CH_2(NH_2)COOH$ | H | H |
| (2) α-Alanine | $CH_3CH(NH_2)COOH$ | $CH_3$ | H |
| (3) Serine | $HOCH_2CH(NH_2)COOH$ | $HOCH_2$ | H |
| (4) Threonine | $CH_3CH(OH)CH(NH_2)COOH$ | $CH_3CH(OH)$ | H |
| (5) Valine | $(CH_3)_2CHCH(NH_2)COOH$ | $(CH_3)_2CH$ | H |
| (6) Methionine | $CH_3S(CH_2)_2CH(NH_2)COOH$ | $CH_3S(CH_2)_2$ | H |
| (7) Phenylalanine | ⌬—$CH_2CH(NH_2)COOH$ | ⌬—$CH_2$ | H |
| (8) Dibromotyrosine | HO—⌬(Br,Br)—$CH_2CH(NH_2)COOH$ | HO—⌬(Br,Br)—$CH_2$ | H |
| (9) Tryptophene | indolyl—$CH_2CH(NH_2)COOH$ | indolyl—$CH_2$ | H |
| (10) Histidine | imidazolyl—$CH_2CH(NH_2)COOH$ | imidazolyl—$CH_2$ | H |
| (11) α-Amino isobutyric acid | $H_2NC(CH_3)_2COOH$ | $CH_3$ | $CH_3$ |
| (12) α-Phenyl glycine | ⌬—$CH(NH_2)COOH$ | ⌬ | H |
| (13) α-Amino-cyclohexane carbonic acid | cyclohexyl($NH_2$)($COOH$) | —$CH_2CH_2CH_2CH_2CH_2$— | |
| (14) α-Methyl-α-phenyl glycine | $H_2NC(CH_3)COOH$—⌬ | ⌬ | $CH_3$ |

(C)

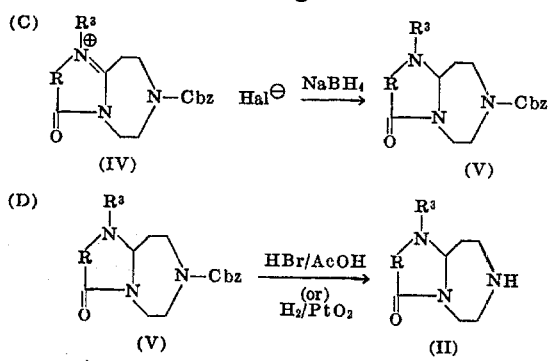

wherein R³ is either hydrogen (—H); lower alkyl, e.g. methyl, ethyl, propyl, isopropyl, butyl and hexyl; phenyl; or phenyl(lower)alkyl, e.g. benzyl;

Hal is either chlorine (—Cl), bromine (—Br) or iodine (—I);
Cbz is carbobenzoxy;
AcOH is acetic acid; and
R has the same meaning as hereinbefore defined. Compounds (I) are also hydrogenated in an inert solvent according to well-known procedures with a platinum dioxide catalyst:

(E)

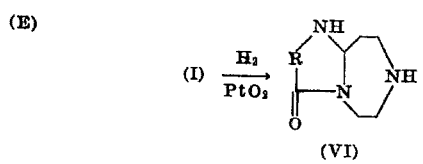

Compounds (VI) are further useful according to the reaction:

(F)

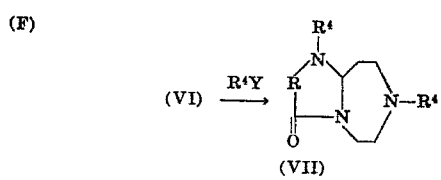

wherein R⁴ is either hydrocarbon (saturated—lower alkyl, e.g. methyl, ethyl and propyl; ethylenically unsaturated lower aliphatic, e.g. allyl; acetylenically unsaturated lower aliphatic, e.g. propargyl; monocarbocyclic aryl, i.e. phenyl; monocarbocyclic ar(lower)-alkyl, e.g. benzyl or carboxylic acid acyl [unsubstituted phenyl-keto-(lower)alkyl, e.g. phenyl-keto-propyl; substituted phenyl-keto-(lower)-alkyl, e.g. p-fluorophenyl-keto-propyl; (lower)-alkyl-keto-(lower) alkyl, e.g. propyl-keto-ethyl];
Y is either chlorine (—Cl) or bromine (—Br); and
R has the same meaning as hereinbefore defined.

Compounds (II), (VI), (VII), (X) and (XIII) and their pharmaceutically acceptable acid addition salts are useful in the same manner and for the same therapeutic purpose as compounds (I). The acid addition salts are prepared according to well-known procedures by neutralizing a solution of the free base with the acid of addition.

To afford an appreciation of the nature of the compounds and intermediates of the instant invention, a series of reaction schemes, illustrative of the utility of said compounds and intermediates, is presented. In the series, wherein each of R, R⁴ and Y has its previously ascribed meaning;
R⁵ has the same meaning as R⁴;
Z has the same meaning as Y; and
AcOH means acetic acid,
starting from compound (III), of which the title compound (h) of Example 4 is exemplary, compound (VI) is produced by conventional hydrogenation with a platinum catalyst. However, if only one molar equivalent of hydrogen is reacted, only the ring double bond is reduced to product compound (VIII). By a reaction comparable to (F) compound (VIII) is converted to compound (IX) which, upon further conventional hydrogenation, is transformed to compound (X). Reacting compound (X) with a halide, R⁵Z, permits substitution on the remaining secondary nitrogen, i.e. the 4-position. Alternatively, treating compound (III) with a mixture of hydrobromic and acetic acids (see Example 5) results in splitting off the carbobenzoxy group without destroying the ring double bond, thus producing compound (I). The reaction of compound (I) with a halide, R⁵Z, results in the substitution of —R⁵ in the 4-position (compound XI). Conventional hydrogenation of compound (XI) reduces the ring double bond to produce compound (XII), which, by a reaction comparable to (F), is converted into compound (XIII).

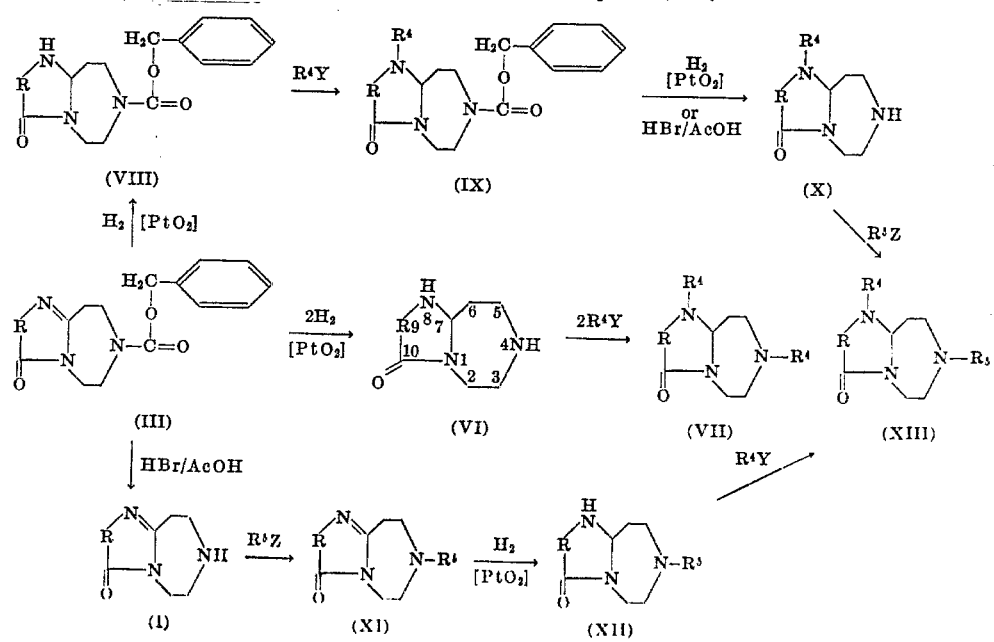

The preparation of compounds (I) is best illustrated by the following examples, in which the parts and percentages are by weight unless otherwise specified and the temperatures are in degrees Centigrade. The relationship between parts by weight and parts by volume is the same as that between the kilogram and the liter.

EXAMPLE 1

1-carbobenzoxy-1,4-diazacycloheptane-5-one

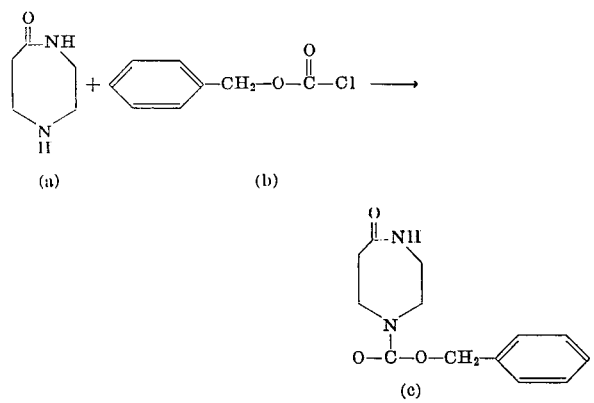

Admix 4.9 parts of 5-homopiperazinone hydrochloride (a), [see Dickerman, S. C., and Lindwall, H. G., "J. Org. Chem.," 14, 530, to 536 (1949)] with in excess of one equivalent of concentrated (aq) potash solution. Extract the resulting base with chloroform.

Dry the obtained extract over potassium carbonate ($K_2CO_3$) and concentrate to 200 parts by volume. Add 5.5 parts of triethylamine to said concentrate, and cool the resultant to 0°. Over a period of 30 minutes add 0.560 part of carbobenzoxychloride (b) (dissolved in 20 parts by volume of chloroform) dropwise to the cooled admixture. Stir the resultant at 0° for 90 minutes and thereafter at 20° for an additional 90 minutes.

Add 100 parts of ice and 100 parts by volume of 2N hydrochloric acid to the resulting admixture, which subsequently separates into layers. Wash the organic phase with (aq) sodium bicarbonate solution. Dry the washed organic phase over magnesium sulfate ($MgSO_4$). Evaporate until a yellow oil remains. Add diethylether to the yellow oil to effect crystallization, melting point (m.p.) 110° to 112°, of the title compound (c). A yield of 4.98 parts is thus obtained.

An elemental analysis reveals the following comparison for $C_{13}H_{16}NO_3$:

| | Calculated, % | Found, % |
|---|---|---|
| C | 62.9 | 63.3 |
| H | 6.5 | 6.6 |
| N | 11.3 | 11.1 |
| O | 19.3 | 19.1 |

EXAMPLE 2

1-carbobenzoxy-5-ethoxy-1,4-diazacycloheptene- $\Delta^{4,5}$

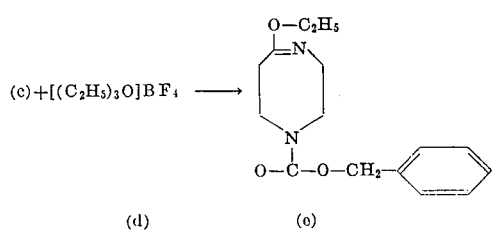

Over a period of 45 minutes and at a temperature of from 20° to 25° add 5.70 parts of (c) [dissolved in 50 parts by volume of methylene chloride ($CH_2Cl_2$)] to triethyloxonium-borofluoride (d), prepared from 4.65 parts of epichlorolydrin and 10 parts of boron trifluoride-etherate [see Meerwein et al., "J. Prakt. Chem.," 154, 83 to 156 (1940)], dissolved in 50 parts by volume of absolute $CH_2Cl_2$. Stir the resulting reaction mixture at the above-noted temperature for 15 hours and then cool same to 5°. Thereafter introduce therein 10 parts of saturated (aq) potassium carbonate ($K_2CO_3$). Follow said introduction by vigorous stirring of the produced reaction mixture.

Separate the organic phase and dry same over $K_2CO_3$. Remove the organic solvent in vacuo, leaving an oil, boiling point (b.p.) 110° to 115°/0.005 mm. There are thus obtained 5.5 parts of title compound, having a refractive index, of 1.5290. Infrared spectra (5 percent in $CH_2Cl_2$) reveal adsorption at 1,670 cm.$^{11}$ (strong $\diagdown C \cdots N \diagup$).

An elemental analysis permits the following comparison for $C_{15}H_{20}NO_3$:

| | Calculated, % | Found, % |
|---|---|---|
| C | 65.2 | 65.4 |
| H | 7.3 | 7.5 |
| N | 10.1 | 10.2 |
| O | 17.4 | 17.6 |

EXAMPLE 3

1-carbobenzoxy-1,4-diazacycloheptyl-5-imino acetic acid

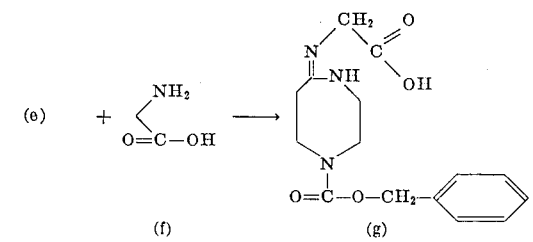

Stir overnight (15 to 17 hours) at room temperature (about 20°) a mixture of 5.5 parts of (e) with a suspension of 1.5 parts of glycine (f) in 16 parts by volume of methanol. Filter and dry the crystalline precipitate (g), m.p. 183.5° to 184° which forms. A yield of 5.1 parts of the title compound, which is very hygroscopic, is thus obtained.

Infrared spectra (in KBr) reveal absorption (broad and strong) at 1,710 cm.$^{11}$ (indicative of carbobenzoxy and $\diagup C=N-$) and strong at 1,630 cm.$^{11}$ (indicative of $-COO^\ominus$). An elemental analysis permits the following comparison for $C_{15}H_{19}NO_4$:

| | Calculated, % | Found, % |
|---|---|---|
| C | 59.1 | 59.0 |
| H | 6.6 | 6.3 |
| N | 13.8 | 13.6 |
| O | 21.0 | 21.0 |

In place of glycine every other α-primary amino monocarboxylic acid having only one primary amino group reacts similarly to produce the corresponding product (XIV) according to the reaction:

(G)

(e) + O=C(R)(NH₂) + O=C(OH)(H) →

(XIV)    (XV)

[structure of carbobenzoxy-protected triazabicyclic amidino acid]

In reaction (G) compound (XIV) is, for example, each of the α-amino acids enumerated in Table A.

EXAMPLE 4

4-carbobenzoxy-1,4,8-triazabicyclo[5,3,0]decen-Δ⁷,⁸-10-one (g) → −H₂O → (h)

Reflux 1 part of the amidino acid (g) in 25 parts by volume of 2-methoxyethanol for 45 minutes. Evaporate the solvent in vacuo. Distill the remaining base (h), b.p. 150° to 155°/0.001 mm.

Infrared spectra (5 percent in $CH_2Cl_2$) reveal absorption at 1,740 cm.[11] (indicative of ring $>C=O$), at 1,710 cm.[11] (indicative of carbobenzoxy) and at 1,650 cm.[11] (indicative of $>C=N-$).

This example is illustrative of a class reaction:

(II)  (XV) $\xrightarrow{-H_2O}$ (III)

wherein R has the same meaning and scope as previously indicated.

The base (h) is a glasslike solid at 10°. To prepare the corresponding hydrochloride, dissolve compound (h) in isopropanol, and neutralize the resulting isopropanolic solution with an isopropanolic solution of hydrogen chloride. Upon neutralization, the hydrochloride crystallizes. Recrystallize said hydrochloride, m.p. 190°, from isopropanol.

An elemental analysis of the hydrochloride, $C_{15}H_{18}ClN_3O_3$, provides the following comparison:

| | Calculated, % | Found, % |
|---|---|---|
| C | 55.6 | 55.6 |
| H | 5.6 | − |
| N | 13.0 | 12.8 |
| O | 14.8 | 15.1 |
| Cl | 10.9 | 10.9 |

In similar manner acid addition salts are prepared from each compound (III). Exemplary of the acid addition salts are those which are pharmaceutically acceptable, such as fumarates, maleinates, tartrates, methane sulfonates, salicylates and hydrosulfates.

EXAMPLE 5

1,4,8-triaza-bicyclo[5,3,0]decen-Δ⁷,⁸-10-one (h) $\xrightarrow[AcOH]{HBr}$ (i)

Add 15 parts by volume of 4N hydrogen bromide (in acetic acid) to 0.310 part of compound (h). After 10 minutes at room temperature, the hydrobromide of compound (i) begins to precipitate. After 1 hour at room temperature, add 300 parts by volume of diethylether to the existing admixture to precipitate the rest of the salt. Thereafter, discard the solvent and crystallize the residue from methanol, m.p. 256° (dec.).

Infrared spectra (KBr) reveal absorption at 3,420 cm.[11] (indicative of —NH—), strong absorption at 1,800 cm.[11] (indicative of $>N-C=O$) and medium absorption at 1,655 cm.[11] (indicative of $>C=N-$). An elemental analysis permits the following comparison for $C_7H_{13}Br_2N_3O$:

| | Calculated, % | Found, % |
|---|---|---|
| C | 26.7 | 27.0 |
| H | 4.2 | 4.7 |
| N | 13.3 | 13.1 |
| Br | 50.7 | 50.6 |

To free the base (i), admix aqueous potassium carbonate solution with the hydrobromide until the admixture is alkaline. Evaporate the obtained organic phase to produce the free base.

In similar manner all said addition salts of compounds referred to herein are converted to their corresponding free base. If the free base is a liquid, it is purified by distillation; if it is a solid, by recrystallization.

This example is illustrative of a class reaction:

(I)    (VII) $\xrightarrow[AcOH]{HBr}$ (I)

EXAMPLE 6

1-carbobenzoxy-1,4,8-triazabicyclo[5,3,0]decan-10-one (h) $\xrightarrow[PtO_2]{H_2}$ (j)

Dissolve 0.162 part of compound (h) in 25 parts by volume of methanol. To the resulting solution add 0.30 part of platinum oxide (PtO₂) and pass hydrogen gas therethrough. After 1 mole of hydrogen is taken up (30 minutes), filter off the catalyst, and evaporate the filtrate to dryness.

Infrared analyses (5 percent in $CH_2Cl_2$) reveal a broad band at 1,700, indicating that the carbobenzoxy rest is still present. No band is found for $>C=N$.

This example is illustrative of a class reaction:

(J)    (III) $\xrightarrow{H_2}{PtO_2}$ (VIII)

It is thought that the invention and its advantages will be understood from the foregoing description. It is apparent that various changes may be made in the processes, in the intermediates and in the final products without departing from the spirit and scope of the invention or sacrificing its material advantages, the processes, intermediates and final products hereinbefore described being merely illustrative of embodiments of the invention.

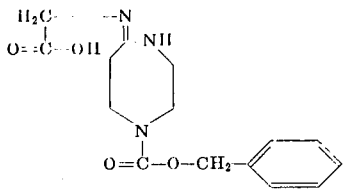

What is claimed is:
1. A compound of the formula

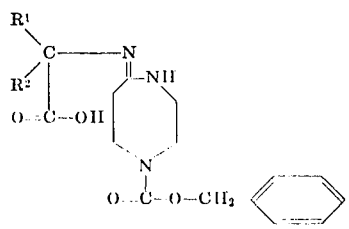

wherein each of $R^1$ and $R^2$ is either, independently, a member selected from the group consisting of a hydrogen atom, lower alkyl, hydroxy(lower)alkyl, (lower)alkylthio (lower)alkyl, phenyl(lower)alkyl, indolyl(lower) alkyl, imidazole(lower)alkyl, phenyl, and benzyl ring-substituted with at least one substituent selected from the group consisting of hydroxy, bromo and iodo; or both taken together with the carbon atom to which they are bound, form a carbocyclic ring having from three to nine carbon atoms and being selected from the group consisting of a saturated hydrocarbon ring and an ethylenically unsaturated hydrocarbon ring.

2. The compound of the formula